Jan. 4, 1938.  L. B. JONES  2,104,655
INSECT SHIELD FOR AUTOMOBILES
Filed July 28, 1936
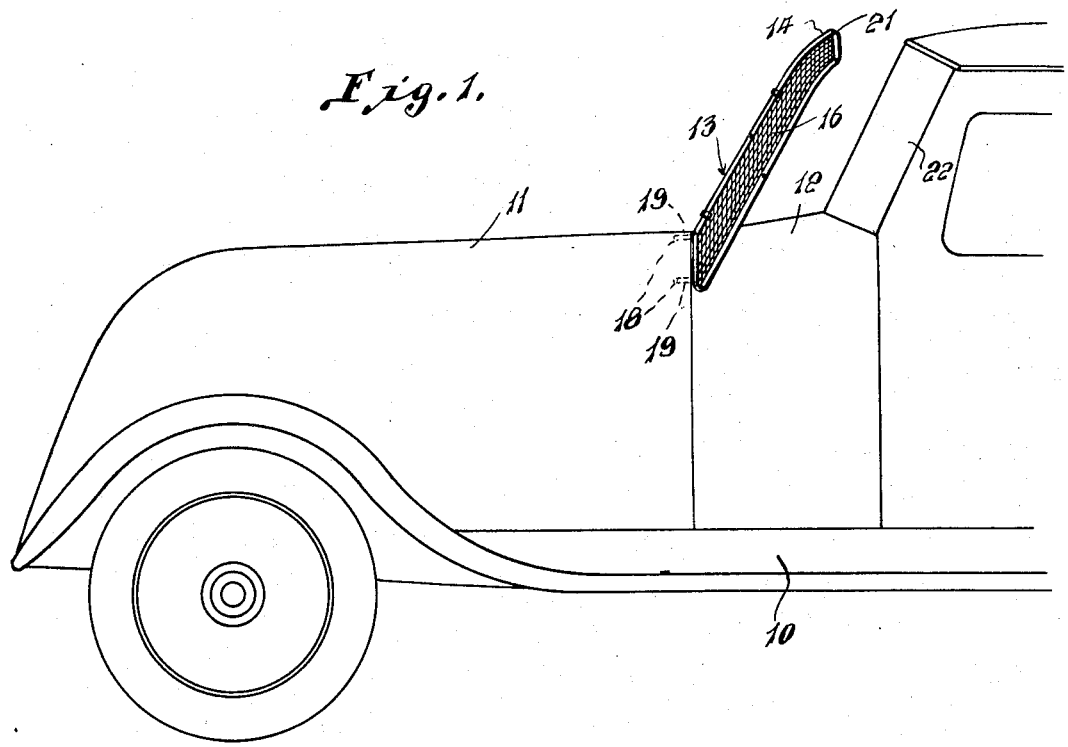
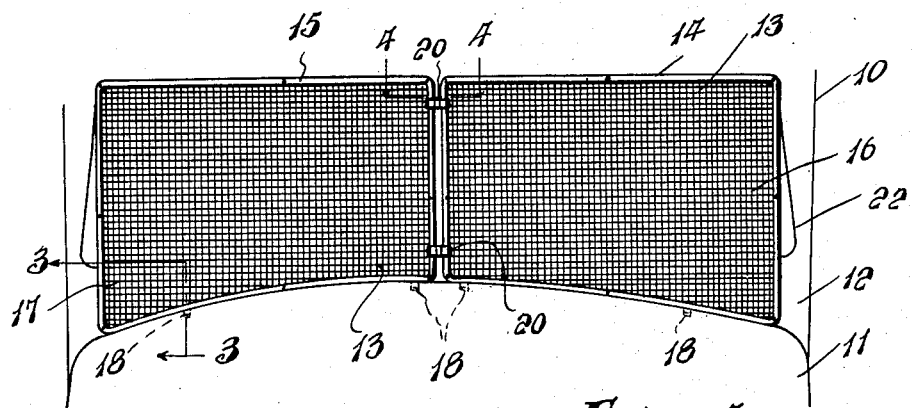
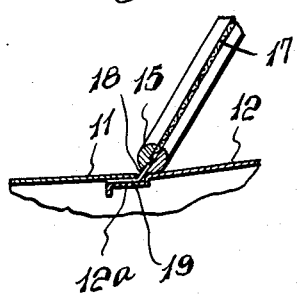
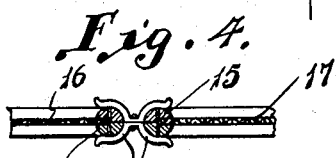
Inventor
Louis B. Jones
Attorney Patented Jan. 4, 1938

2,104,655

UNITED STATES PATENT OFFICE 2,104,655

INSECT SHIELD FOR AUTOMOBILES

Louis B. Jones, Polo, Ill.

Application July 28, 1936, Serial No. 93,058

1 Claim. (Cl. 296—84)

This invention relates to insect shields for windshields of automobiles. The principal object of the invention is to provide a shield that will prevent insects from striking and spotting the windshield and thus impairing the driver's vision.

Another object is to provide a shield that has sufficient flexibility to prevent insects striking it sticking thereto, and being inclined rearwardly cause them to pass over the top of the vehicle and by so doing not hamper the driver's vision.

Another object of the invention is to provide an insect shield that can be easily and quickly attached to or removed from an automobile without the use of tools.

A further object is to provide a combination insect and glare shield by appropriately coloring the mesh of the wire screen.

Other objects and advantages of the invention will become apparent from the drawing and the following description.

In the drawing:—

Figure 1 is a fragmentary side view in elevation of an automobile shield showing the insect shield attached thereto;

Figure 2 is a front view in elevation of the same showing the means for securing the frames together;

Figure 3 is an enlarged view in cross section on the line 3—3 of Figure 2; and

Figure 4 is an enlarged view in cross section on the line 4—4 of Figure 2.

Referring more particularly to the drawing wherein like reference characters designate like or corresponding parts in the several views, 10 is an automobile having a hood 11 and a cowl 12. The forward end of the cowl 12 is offset at 12ª to accommodate the rear end of the hood 11.

The insect shield 13 is composed of two frames 14 and 15 of metal rod or heavy wire, and to which are secured wire mesh screen fabrics 16 and 17. Fastening members consisting of pins 18 are provided on the lower sides of the frames 14 and 15, said numbers being angular, as shown at 19, so that when they are secured between the rear edge of the hood and the cowl the frames are inclined rearwardly and upwardly.

The frames 14 and 15 are removably secured together by means of clips 20 which hold the frames 14 and 15 in position relatively to each other.

The frames 14 and 15 are sufficiently flexible so that they can be bent to conform to the contour of the hood. The top of the frames 14 and 15 are inclined sharply rearwardly as shown at 21, in Figure 1 and as the frames are set at an angle as shown in Figure 1 insects striking the shield will be carried up and over the top of the car 10 and they are prevented from striking the windshield 22.

The wire fabrics 16 and 17 may be colored to absorb the glare from lights of on-coming cars at night. This coloring also acting to prevent sun glare in the daytime to some extent.

To apply the device to an automobile the hood is raised on each side. The members 18 are placed under the hood, the extremities thereof resting between the hood and the offset part 13. The hood 11 is then lowered and clamped and locked in position.

It is to be understood that the invention is not limited to the exact construction as herein shown and described, the foregoing presenting merely the preferred embodiment of the invention.

I claim as my invention:—

A windshield screen comprising in combination with the cowl and hood of a vehicle, a pair of frames provided with studs extending from the base thereof, mesh screen fabric secured to said frames, spring clips adapted to connect the adjacent portions of said frames, and said studs adapted to be engaged between the cowl and hood of the vehicle to support the screen in front of the windshield.

LOUIS B. JONES.